March 4, 1947.    H. M. BANUELOS    2,416,891
TENS TRANSFER MECHANISM
Filed Aug. 1, 1940    9 Sheets-Sheet 1

INVENTOR
*Hilario Moreno Banuelos*
BY
*Blair, Curtis & Hayward*
ATTORNEYS

March 4, 1947. H. M. BANUELOS 2,416,891
TENS TRANSFER MECHANISM
Filed Aug. 1, 1940 9 Sheets-Sheet 2

Fig. 2.

INVENTOR
*Hilario Moreno Banuelos*
BY
*Blair, Curtis & Hayward*
ATTORNEYS

March 4, 1947. H. M. BANUELOS 2,416,891
TENS TRANSFER MECHANISM
Filed Aug. 1, 1940 9 Sheets-Sheet 4

Fig. 4.

INVENTOR
Hilario Moreno Banuelos
BY
Blair, Curtis & Hayward
ATTORNEYS

March 4, 1947.  H. M. BANUELOS  2,416,891
TENS TRANSFER MECHANISM
Filed Aug. 1, 1940  9 Sheets-Sheet 5

INVENTOR
Hilario Moreno Banuelos
BY
Blair, Curtis & Hayward
ATTORNEYS

March 4, 1947. H. M. BANUELOS 2,416,891
TENS TRANSFER MECHANISM
Filed Aug. 1, 1940 9 Sheets-Sheet 7

INVENTOR
Hilario Moreno Banuelos
BY
Blair, Curtis & Hayward
ATTORNEYS

March 4, 1947.    H. M. BANUELOS    2,416,891
TENS TRANSFER MECHANISM
Filed Aug. 1, 1940    9 Sheets-Sheet 8

INVENTOR
Hilario Moreno Banuelos
BY
Blair, Curtis & Hayward
ATTORNEYS

March 4, 1947.   H. M. BANUELOS   2,416,891
TENS TRANSFER MECHANISM
Filed Aug. 1, 1940   9 Sheets-Sheet 9

INVENTOR
Hilario Moreno Banuelos
BY
Blair Curtis & Hayward
ATTORNEYS

Patented Mar. 4, 1947

2,416,891

UNITED STATES PATENT OFFICE 2,416,891

TENS TRANSFER MECHANISM

Hilario Moreno Banuelos, Mexico City, Mexico

Application August 1, 1940, Serial No. 349,164

5 Claims. (Cl. 235—138)

This invention relates to improvements in tens transfer mechanism for machines such as registers, adding machines and the like.

An object of this invention is to provide a machine of the above character which will be economical to make, both from the standpoint of labor and materials used, and wherein the material is so disposed as to provide strength without unduly heavy construction; which is simple, practical, and durable in use; which may be quickly and easily operated; which may be readily taken apart for purposes of replacement or repair; which may embody parts manufactured from relatively light and inexpensive materials; which will accurately register the sums or amounts entered thereon; and which, as applied to a cash register, or the like, will provide an accurate and complete record of each sale or transaction. Other objects and advantages will be in part obvious and in part pointed out hereinafter.

One embodiment of the present invention, as applied to a cash register or the like, is described in the following specification and shown in the drawings appended hereto and in which.

Figure 1:
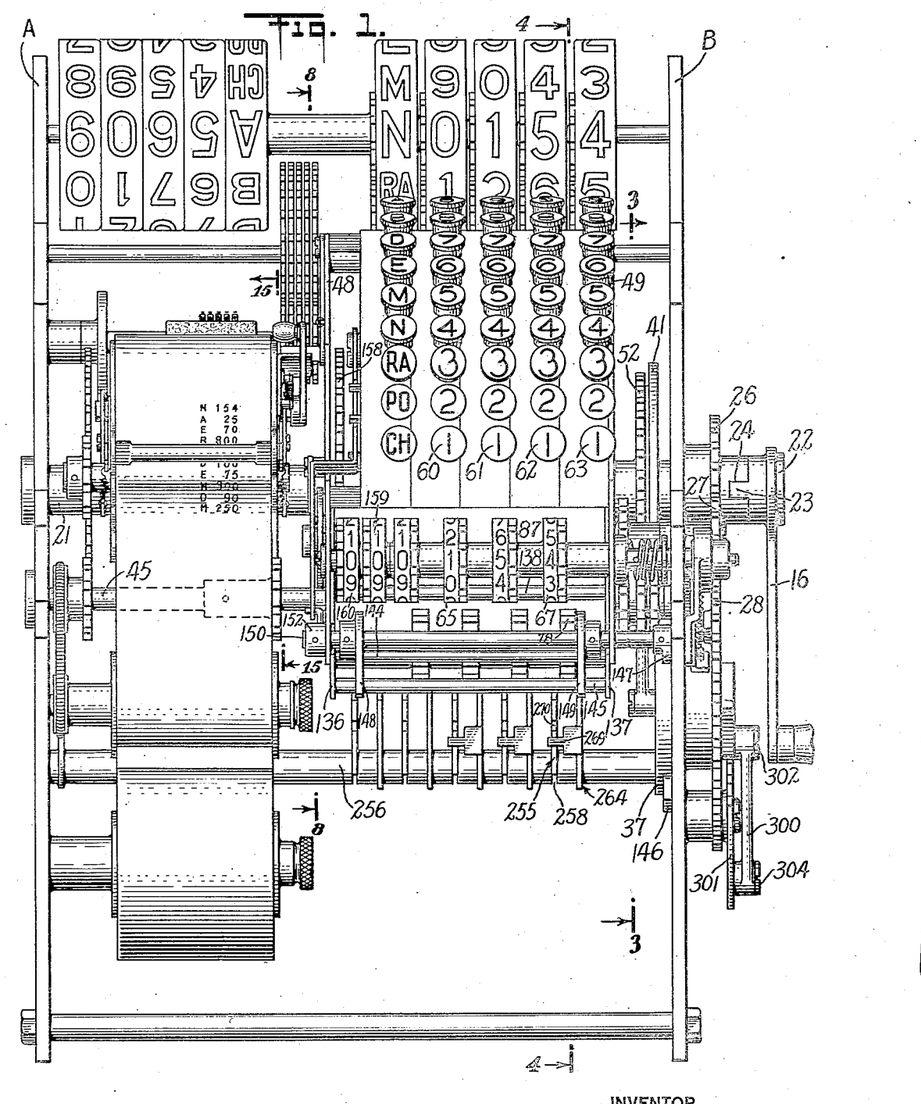
Figure 1 is a front elevation with the housing or outer casing removed.

In operation of a machine of the type shown in Figure 1, for example, as for recording or registering the amount of a sale, the user presses inwardly on keys representing the number or amount to be entered on the register. This places said keys and certain tripping devices in actuating position. The indicating, totalizing and printing mechanism, if any, of the machine is actuated by suitable means such as crank 16, which is stopped after two turns.

Movements of the mechanism as crank 16 is turned may conveniently be divided into four stages. During the first stage, certain parts of the adding mechanism or totalizer are moved to operative position. During the second stage, the adding mechanism takes up the new amount or number set up on the amount keys and the new total is transmitted to the totalizer wheels. At the same time, the indicator wheels are actuated to indicate the number or amount registered.

During the third stage, the printing mechanism, if any, is actuated to print the registered number or amount on a roll of paper or other record sheet. During the fourth stage, the tens transfer devices carry over accumulated ten values from each individual totalizer wheel of a lower order to the wheel representing the next higher order of digits.

As shown in the drawings, a fixed shaft 21 (Figures 1 and 2) is supported by side walls A and B. Crank 16 turns freely on the right-hand end of said shaft where it is held in position by a headed bolt 22 (Figure 1), threaded in the end of shaft 21. The hub of crank 16 has lugs, as 23, which interlock with slots 24 and 25 (Figure 2) in the hub of a crank gear 26 also loosely mounted on shaft 21 to rotate said gear when crank 16 is turned. For the purpose of substituting a power drive, for example, crank 16 may be detached from shaft 21 by removing headed bolt 22.

Figure 2:
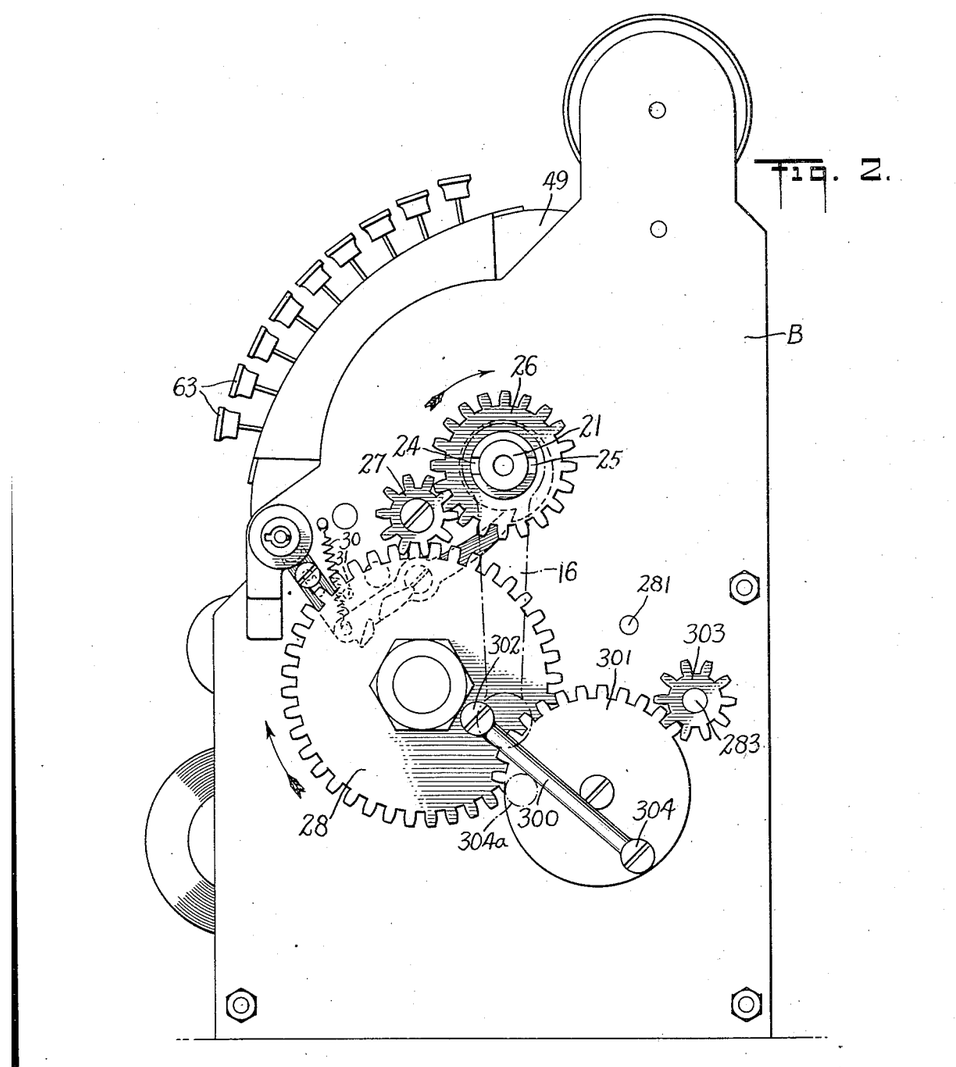
Figure 2 is an end elevation of the right-hand side of Figure 1.

In operation, crank gear 26, which has twenty teeth, turns clockwise as viewed in Figure 2 and meshes with an idler gear 27 which has ten teeth and in turn meshes with a gear 28 which has forty teeth. Idler gear 27 mounted on a stud 27a extending laterally from side wall B, causes gear 28 to rotate in the same direction (clockwise) as crank gear 26 and to make one full turn for each two full turns of gear 26. The operating parts are so constructed and arranged that two full turns of the crank in a clockwise direction from its dotted line position shown in Figure 2, complete the four stages of operation of the machine.

Figure 4:
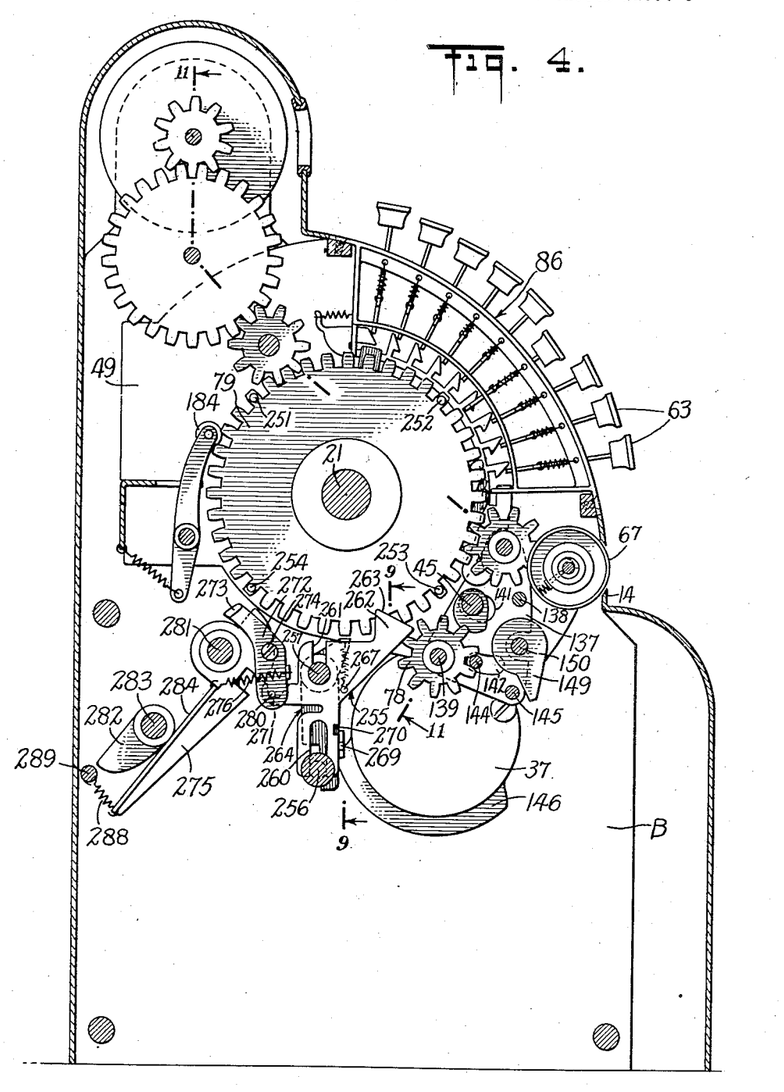
Figure 4 is a vertical cross section on the line 4—4 of Figure 1.
Figure 13:
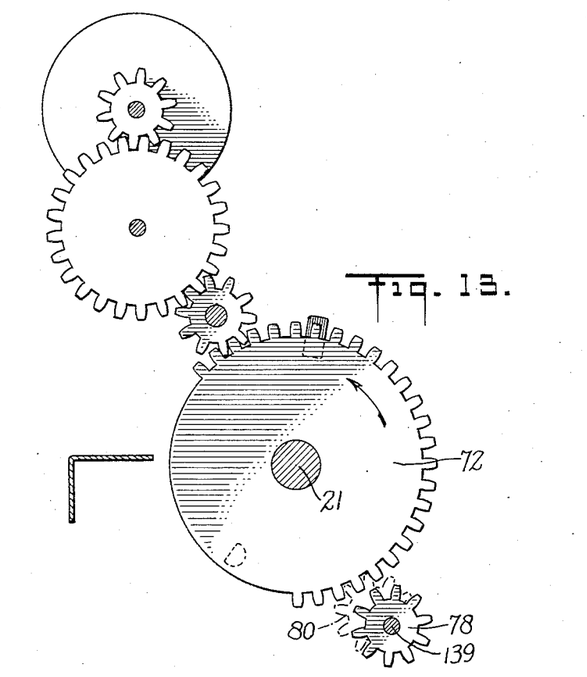
Figure 13 is a diagrammatic showing of a part hereinafter called a primary gear and mechanism operatively associated therewith.
Figure 14:
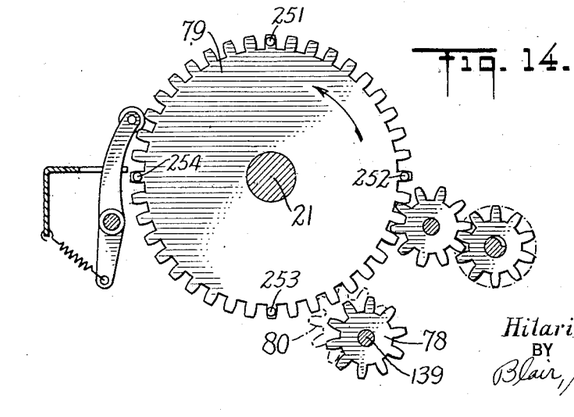
Figure 14 is a digrammatic showing of a part hereinafter called a secondary gear and mechanism operatively associated therewith.

Referring to Figures 13 and 14, the secondary gear 79 is connected to rotate clockwise with primary gear 72 by gear 78 only during the second or additive stage. For this purpose gear 78 is mounted on a swinging frame pivotally supported between side plates 48 and 49 on shaft 58. This frame comprises spaced end plates 136 and 137 (Figures 1 and 4) triangular in shape and pivotally mounted on shaft 58 which extends through them at their upper corners (Figure 4). Plates 136 and 137 are held in spaced relationship by transversely extending suitably placed spacing bars 138 and 145 (Figures 1 and 4). A fixed shaft 139 mounted transversely in said frame supports the gears 78 which, during the second stage, connect the first four (from right to left) sets of primary and secondary gears respectively (Figure 11) and rotate freely on said shaft 139 independently of each other. As shown in Figures 4, 5, 6 or 7, slots 141 and 142 in plates 136 and 137 of the swinging frame are provided to permit a shaft 45 and a spacing bar 144, respectively, to pass through or across the path of movement of parts of the frame without interfering with its pivotal movement. Spacing bar 144 acts as a stop against which portions of the gears 78 on shaft 139 abut when said gears are held in disengaged relation to the primary and secondary gears by suitable means, as a spring 143, Figure 8, connected to plate 136 of the frame and to supporting plate 48 to bias the lower end of said frame outwardly.

Figure 8:
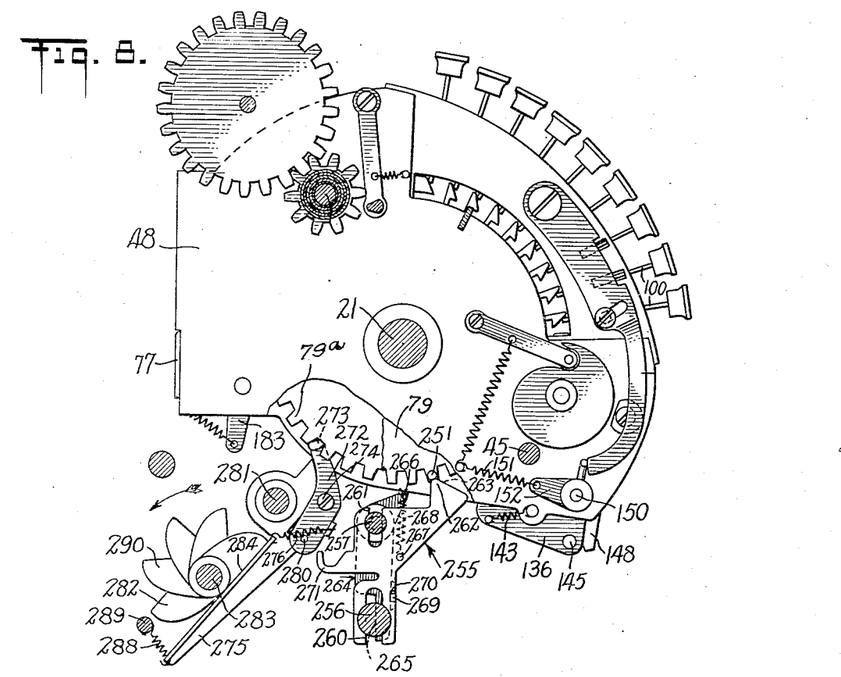
Figure 8 is a fragmentary vertical cross section on the line 8—8 of Figure 1.

Referring to Figure 2, which shows portions of devices for actuating said frame and gears 78 thereon, cam disc 37, which rotates 360° during the four stages of operation, has a peripheral cam 146. At the beginning of the second stage, said cam 146 engages an arm 147 secured to a shaft 150 which has end portions journaled in and extending through supporting plates 48 and 49 and which carries cam arms 148 and 149 (Figures 1 and 4). A lever arm 152, Figure 8, is secured to the left end of shaft 150, as viewed in Figure 1, at the outside of supporting plate 48. A spring 151 having one end connected to the free end of this lever arm and the other end to supporting plate 48 (Figure 8) normally biases shaft 150 and cam arms 148 and 149 in a neutral or inoperative position (Figure 4).

Figure 5:
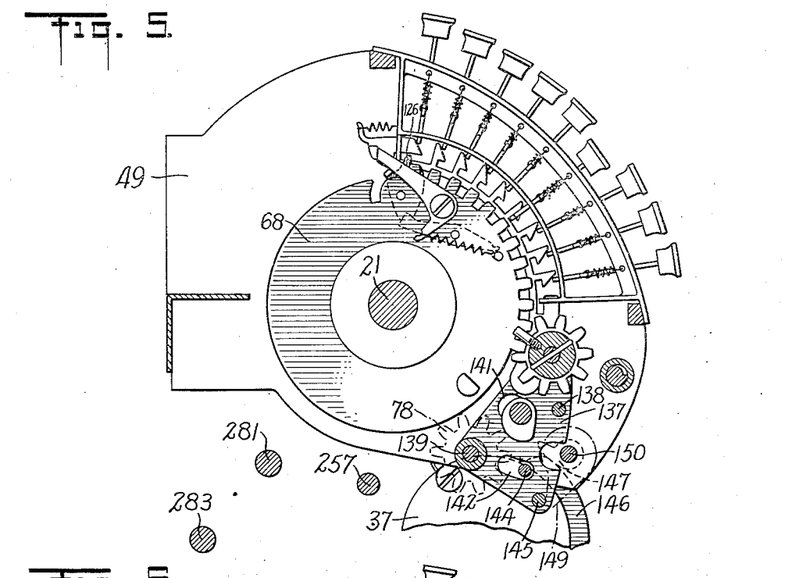
Figure 5 is a vertical cross section on the line 5—5 of Figure 11.
Figure 6:
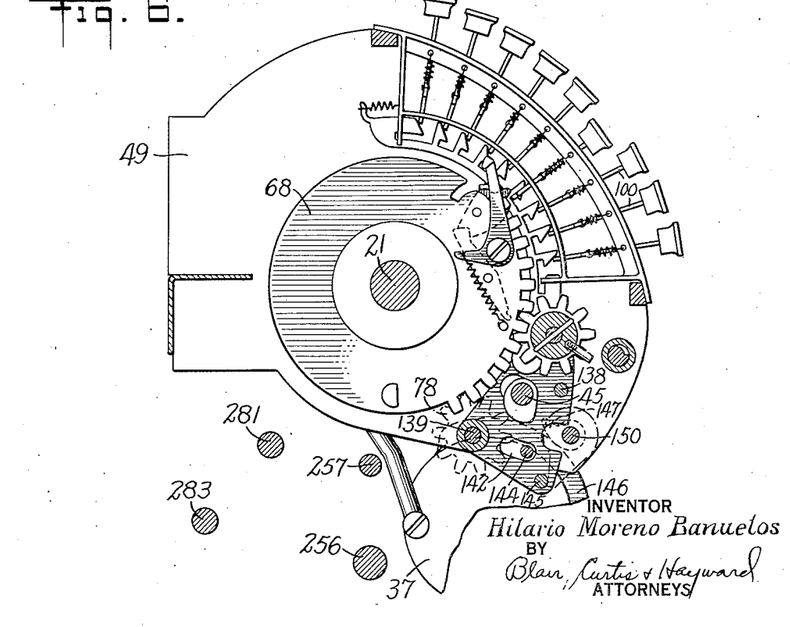
Figure 6 is a vertical cross section similar to Figure 5 but with certain parts in different relative positions.
Figure 7:
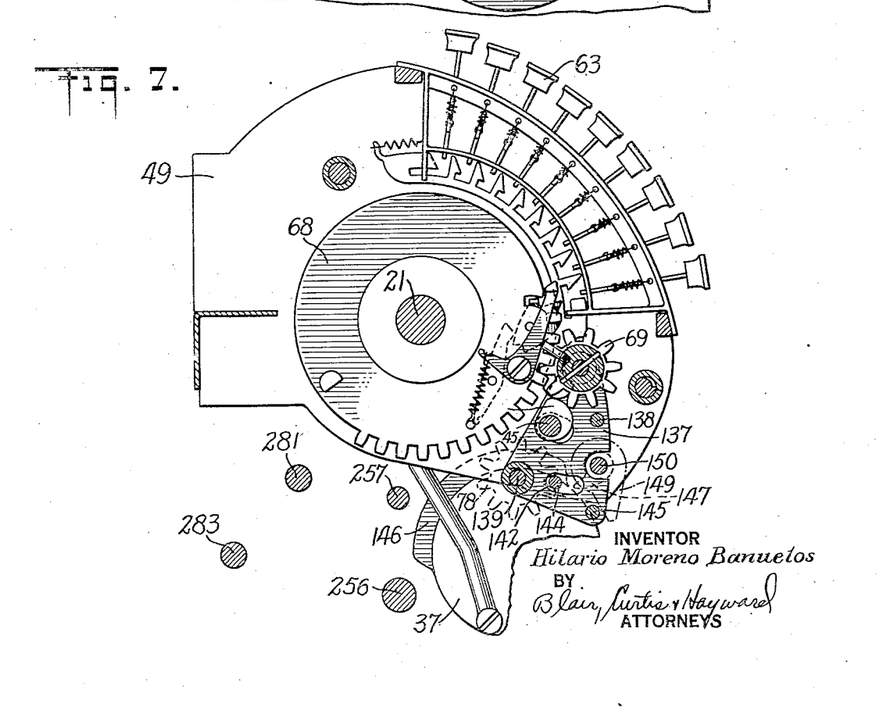
Figure 7 is a vertical cross section similar to Figure 5 but with certain parts in different relative positions.

When shaft 150 is rocked by cam 146 engaging arm 147, cams 148 and 149 swing inwardly against spacing bar 145 and deflect the frame which carries gears 78 to the position shown in Figure 5, wherein the parts are shown positioned at the beginning of the second stage with gears 78 in mesh with primary gears 72 and secondary gears 79. This position is maintained through the second stage (Figure 6), i. e., while cam 146 continues to engage cam 147. At the end of the second stage, cam 146 disengages and releases arm 147 and permits spring 151 to restore shaft 150 and the cams 148 and 149 thereon to neutral position. When pressure is thus released from bar 145 the gears 78 carried on shaft 139 are disengaged from the primary and secondary gears and remain so disengaged during the two remaining stages of each complete operation.

Figure 1 shows four sets of amount keys and one set of clerks keys. Each set of amount keys is connected to actuate a totalizer wheel by a transmission train, Figure 11, comprising among other parts a pawl carrying disc, as 68, Figure 12, a primary gear, as 72, Figure 13, and a secondary gear, as 79 (Figure 14). Thus, for example, amount key set 61, third from the right (Figure 1), is connected to actuate totalizer wheel 65 through a train identified in Figures 11 and 17 at 155. Accordingly, gears 78 for connecting the primary and secondary gears of the four numeral controlled trains are provided only for the four amount key sets 63, 62, 61 and 60.

The primary and secondary gears of transmission train 157 (Figure 11) are, however, not connected by a gear 78 and act individually. The secondary gears of trains 157 and 158 are also not controlled from any tabulator keys, but operate only to add or accumulate, on wheels 159 and 160 respectively, Figure 1, unit values representing tens of the next lower order of digits accumulated on the totalizer wheel next to their right. The pawl disc 68 and primary gear 72 of train 157 are however used in producing a printed record along with a number record, if desired, corresponding to indicia exposed on the clerk keys or to a registered number as it appears at the top of the register.

During operation, every time a totalizer wheel passes from "9" to "0" reading, or completes its 360° turn, it is necessary that the accumulated ten value be carried to the next totalizing wheel thereabove as a unit of the next higher order. For example, if the unit wheel 67 last to the right, Figure 1, shows a "9," and a "2" is registered on the machine, the unit wheel is turned to register "1." The accumulated values of ten is taken up on the second or tens wheel which is moved a distance equal to one gear tooth so that it registers "1." Accordingly, mechanism is provided whereby each totalizer wheel is so connected that the next higher totalizer wheel moves one place (unit) every time a totalizer wheel of lower number order is rotated 360° or past "0," independently of whether or not angular movement representing another value is imparted to said wheel of higher order by operation of a corresponding amount key. As the totalizing wheels are connected to operate with the secondary gears, tens transfer mechanism includes devices connecting each secondary gear with the secondary gear of the next higher order to rotate said gear one tooth whenever the totalizing wheel of lower order completes its 360° or passes "0."

Figure 11:
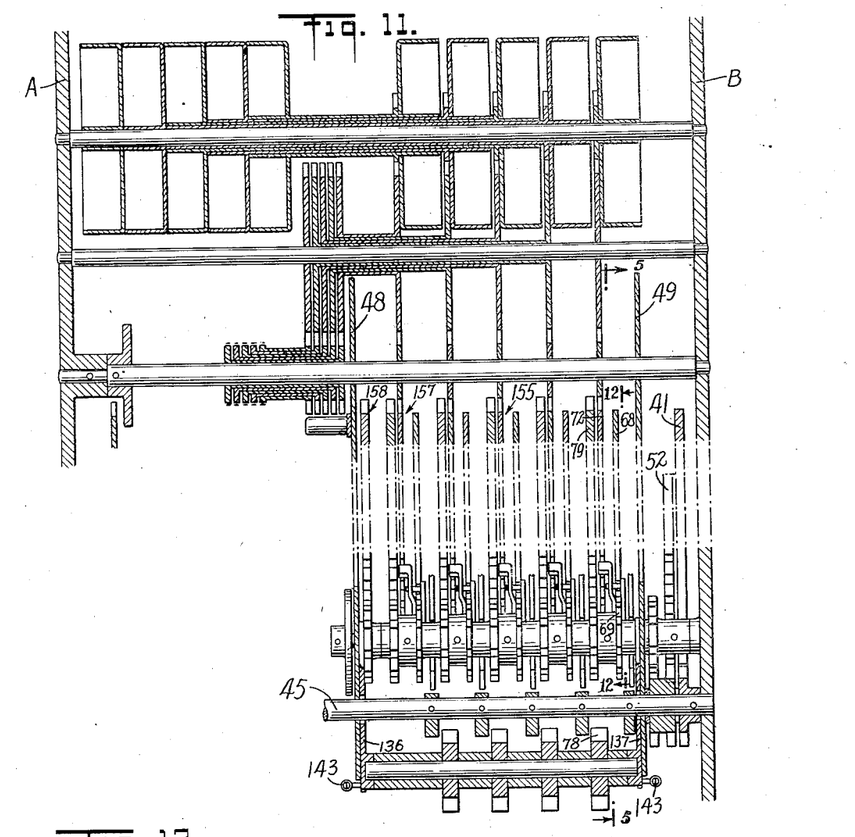
Figure 11 is a staggered vertical cross sectional view on the line 11—11 of Figure 4.
Figure 12:
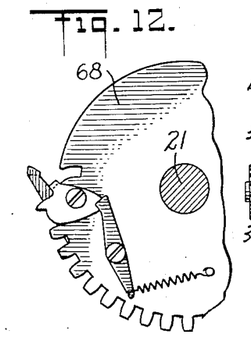
Figure 12, a fragmentary vertical sectional view on the line 12—12 of Figure 11.

Accordingly, each secondary gear, as 79, except that of the highest order of numbers, as that shown furthest to the left in Figure 11, has four pins projecting laterally to the left thereof to coact with mechanism to be hereinafter described. As the devices for thus operatively connecting adjacent secondary gears is substantially similar, the description will be limited to that connecting secondary gear 79 (Figure 9) to secondary gear 79a of the next higher order and positioned to the left thereof.

Figure 9:
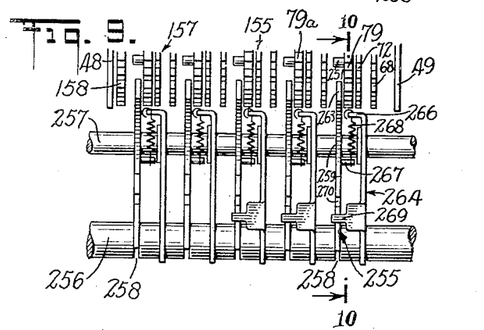
Figure 9 is a fragmentary front view in elevation of a portion of the machine taken from the line 9—9 of Figure 4.

Referring now to Figures 4 and 8, each of the secondary gears including 79 and 79a has forty teeth; and gear 79 has pins 251, 252, 253 and 254 projecting to the left as viewed in Figure 9, adjacent to every tenth tooth. These pins are positioned to synchronize in operation with the completion of each successive rotation cycle of numerals on the totalizing wheel 67, Figure 1, which is actuated by gear 82, Figure 4, carrying ten teeth, so that, as totalizing wheel 67 passes the zero point, one of the four pins is brought into position to operate a latch, generally identified at 255 (Figure 8).

Said latch 255 is mounted for vertical reciprocating movement on shafts 256 and 257, Figure 8, extending transversely across the machine and journaled in side walls A and B. These shafts have annular guide grooves 258 and 259 therein; and latch 255 has longitudinal slots 260 and 261 extending inwardly from its lower and upper ends respectively which engage said annular grooves 258 and 259 to hold the latch in upright operative position and slidably movable in the said grooves. A head 262 of latch 255 provides a cam edge 263 which extends across the path of movement of the pins 251, 252, 253, and 254 on secondary gear 79.

Figure 10:
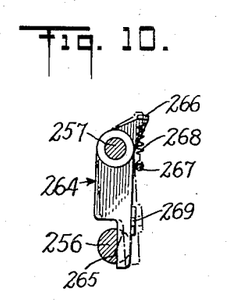
Figure 10 is a fragmentary vertical cross section taken along the line 10—10 of Figure 9.

Referring to Figures 9 and 10, a latch lever generally identified at 264 is pivotally mounted on shaft 257 adjacent reciprocating latch 255. The upper end of lever 264 extends outwardly to the right (Figure 10) and has a laterally projecting lug 265 extending to the left (Figure 9). A spring 268 connecting lug 266 to a pin 267 on latch 255 biases the upper end of lever 264 to the right (Figure 10) and its lower end to the left to engage a cam slot 265 in shaft 256. This spring also biases latch 255 toward raised position wherein the bottom of its slot 261 (Figure 4) is held yieldingly against shaft 257. Extending to the left of latch lever 264 (Figure 9) is a lug 269 normally bearing yieldingly on the outer edge of latch 255 below a notch 270 therein. When said latch 255 is moved downwardly, as hereinafter described and as shown in Figure 8, lug 269 drops into said notch 270 to releasably hold latch 255 in its lower position.

Latch 255, biased upwardly by spring 268 normally positions cam edge 263 in the path of the pins on secondary gear 79, as described. When a zero point on a totalizer wheel 67 is passed during the second or additive stage, one of the trip pins, as 251 on gear 79, strikes and rides over the cam edge 263, thereby depressing the latch 255 to its said lower position in which it is releasably held by engagement of lug 269 with notch 270 (Figure 8) until later released, as hereinafter described.

Latch 255 has a hook 271 extending to the left (Figures 4 and 8) and which, when said latch is in upper position, engages pin 280 on a pawl arm 272 to normally hold pawl 273 out of engagement with the teeth of secondary gear 79a (Figure 4).

Pawl arm 272 is pivotally mounted at 274 on an actuating lever 275; and a spring 276 secured thereto and to actuating lever 275 biases said pawl toward the teeth of secondary gear 79a. When latch 255 is moved downwardly by a trip pin, as 251, Figure 8, riding over cam edge 263, as previously described, the hook 271 disengages pin 280 permitting pawl arm 272 to rock and carry pawl 273 into operative engagement with teeth of secondary gear 79a (Figure 8). The latch lever 264 now releasably holds reciprocating latch 255 in its lower position until the fourth stage, and thus prevents hook 271 of latch 255 from reengaging pin 280 under the following circumstances. If, during the additive operation just described, the next gear, as 79a, is also rotated to register a key added amount on a corresponding totalizer wheel, it is clear that the pawl 273, now released for transferring a ten value from gear 79 to gear 79a, will be ratcheting on the teeth of said gear 79a to the extent that the latter is rotated in the second stage. If, under these circumstances hook 271 were permitted to return to up position immediately after being depressed by the passage of pin 251 on gear 79, said hook would re-engage pin 280, or pawl arm 272 would be jammed while vibrating (due to said ratcheting during the additive rotation of gear 79a). This undesirable result is prevented by holding actuated latches 255 and their respective hooks 271 in depressed position until the second stage is completed. Thus, both the additive operation and the later transfer operation of any affected gear 79a are protected against failure to function under the circumstances described.

Actuating levers 275 carrying the pawl arms 272 are pivoted in spaced relation on a transverse shaft 281 supported at its ends by the side walls A and B and are individually rocked counter-clockwise, Figure 8, by cams, as 282, 290, secured in longitudinally and angularly spaced relation on a transverse shaft 283 journaled in side walls A and B. Each lever 275 is biased toward engagement with the cam surface of a cam, as 282, by a spring 288 connected at one end to transverse bar 289 (Figure 8). Shaft 283 is rotated 360° during the fourth stage of operation, which swings the cams, as 282, in succession against and across the rear surfaces 284 of levers 275 moving them counter-clockwise, Figure 8. It will be understood that the cams hereinabove referred to are arranged with all their cam faces disposed at one side of shaft 283 within an angle of 180°. This advances pawl 273, now engaging secondary gear 79a, sufficiently to move said secondary gear 79a an angular distance of one gear tooth and thus, by previously described transmission means, to advance the corresponding totalizer wheel one space in addition to any advance made during a previous stage of the same operation.

During the second stage wherein the secondary gears 79 actuate totalizer wheels to add a number set up by previously depressing one or more amount keys, the trip pins, as 251, etc., on various of the secondary gears 79 may move into position to engage and depress latches 255 and release the pawl actuating levers 272 so that pawls 273 engage the secondary gears 79a. During the fourth stage, all the actuating levers 272 are operated by the means above described so that, if any pawl 273 then engages a secondary gear 79a, that gear is moved a distance of one tooth; and the corresponding totalizer wheel is advanced one number or unit.

Figure 17:
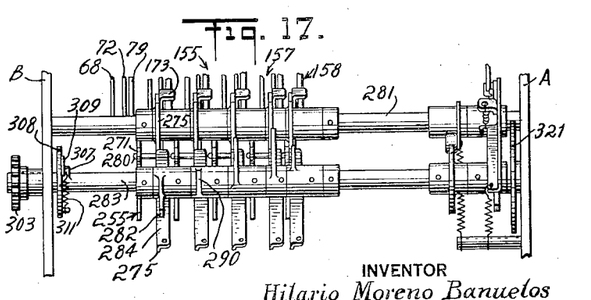
Figure 17 is a fragmentary rear view in elevation showing the arrangement of accumulator actuating cams and others on the shaft provided for that purpose.

Referring to Figures 4, 8 and 17, the cams, as 282, and others on shaft 283 for actuating levers 275 are secured in spaced and angularly staggered relationship on said shaft 283. Thus, cam 282 through which accumulations of tens on the unit totalizer wheel are added as units to the tens totalizer wheel is positioned so that it strikes its corresponding actuating lever 275 a predetermined interval before the next cam 290 engages the next actuating lever 275. Thus, during the fourth stage, each actuating lever 275 after the first in order operates after the preceding lever. This spacing is important because, if the accumulated unit of a given order happens to be the tenth, the accumulation continues into the next higher order. Thus, if the totalizer shows "9999"

as a total and the next added number is "six," said "six" is added to the units cylinder in the second stage and an accumulated unit will be carried forward during the fourth stage into each of the columns from tens to ten thousands.

Referring now to Figure 2, gear 28 is shown as connected to a gear 301 by a link 300 secured thereto by screws 302 and 304. Gear 28 rotates 360° clockwise during each registration operation. During the first 180°, link 300 rotates gear 301 clockwise, moving screw 304 to the position indicated by the dotted line 304a. During the remaining 180° rotation of gear 28, link 300 rotates gear 301 counter-clockwise back to its original position. Gear 301 meshes with a gear 303 mounted at the outer end of cam shaft 283 (Figures 2 and 17) in such a manner that during the clockwise movement of gear 301, Figure 2, gear 303 turns freely on shaft 283 counterclockwise but, during the counter-clockwise movement of gear 301, that is, during the fourth stage of operation, said gear 303 rotates clockwise and rotates cam shaft 283 to move the actuating levers 275 by means of the cams, as 282 above described and for other purposes hereinafter set forth.

Figure 3:
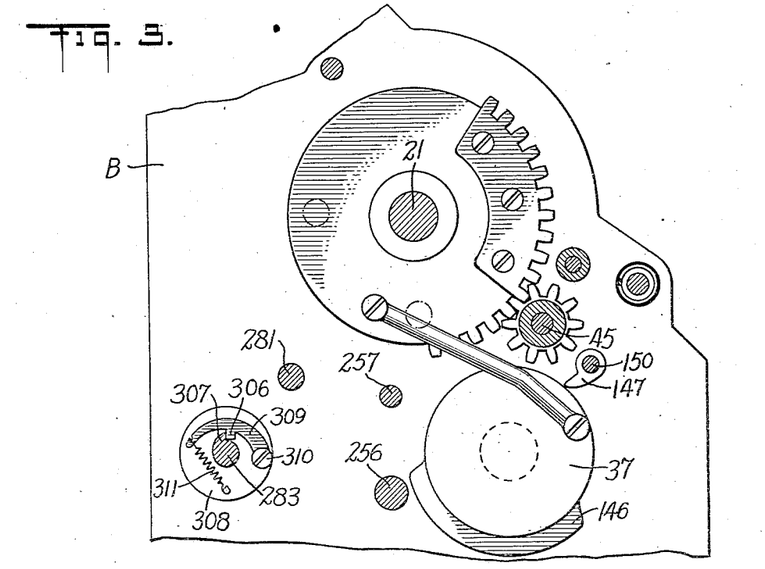
Figure 3 is a vertical cross section on the line 3—3 of Figure 1.

As shown in Figures 2, 3 and 17, devices for effecting this mode of operation of shaft 283 include a disc 308 connected to gear 303 which revolves freely on shaft 283. A lever 309 is pivoted to disc 308 at 310 and biased toward shaft 283 by a spring 311 secured to disc 308. Lever 309 has a lug 306 extending inwardly and engaging shaft 283 which is provided with a shoulder or detent 307. In operation, during the first half turn of gear 28, disc 308 rotates clockwise, Figure 3, slightly more than 360° and lug 306 merely rides freely, clockwise, Figure 3, over the surface of said shaft 283 until it drops in behind shoulder 307. When disc 308 reverses with gear 303, as during the second half of the full turn of gear 28, lug 306 encounters shoulder 307 to turn shaft 283 counterclockwise, Figures 3 and 4, and actuate levers 275 during the last stage.

To prevent undesired slippage or rotation of shaft 283 in relation to lug 306 when the lug is moving counter-clockwise, a disc 312 having a peripheral notch 317 is secured on shaft 283, Figure 17. A lever 313, pivotally mounted on shaft 281, carries a damper roller 315 biased into contact with the periphery of disc 312 by a spring 316 secured to end wall A and the lever 313. In operation, when lug 306 is sliding over shaft 283, roller 315 rests yieldingly in notch 317 on the periphery of disc 312 preventing rotation thereof and of shaft 283. When the shaft 283 is positively turned in the opposite direction as in the fourth stage, roller 315 follows the periphery of the disc 312 which turns with it until roller 315 engages in notch 317 at the end of the registering operation.

Figure 15:
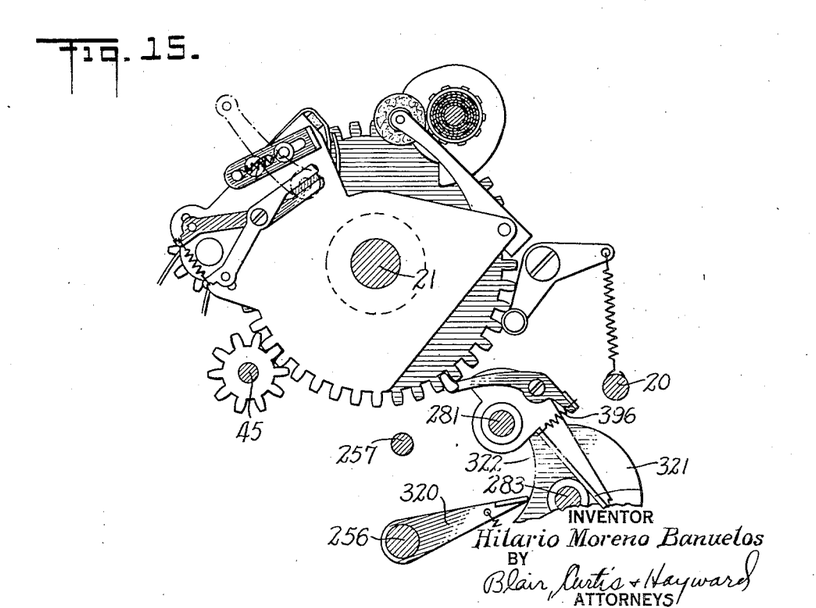
Figure 15 is a vertical cross section on the line 15—15 of Figure 1.
Figure 16:
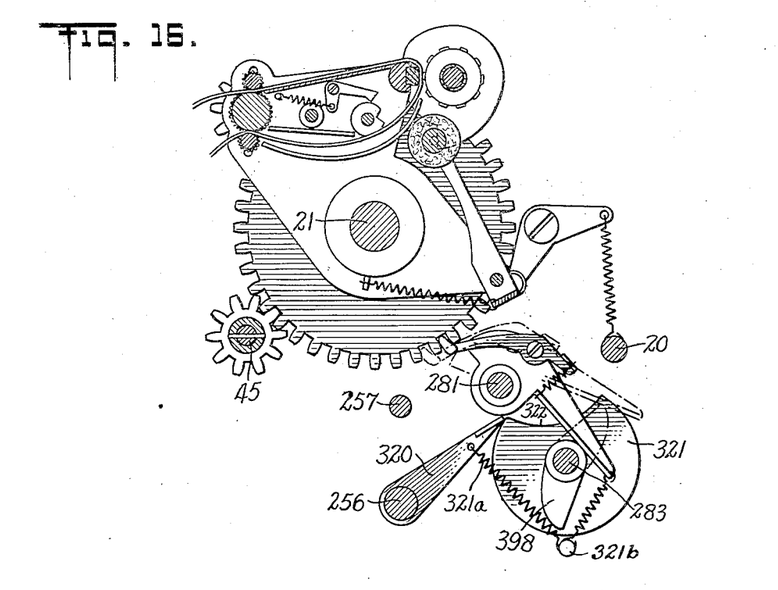
Figure 16 is a view similar to that of Figure 15 but with certain parts in different relative positions.

During the fourth stage when shaft 283 is actuated, the latch levers 264 holding reciprocating latches 255 (Figures 8, 9 and 10) are released by rocking movement of shaft 256 (Figures 10 and 16) the annular grooves 258 of which engage lower ends of latch levers 264. A portion of bottom surface of each annular groove 258 is cut away to present a straight or flat bearing or camming surface 265 normally disposed in the position as shown in full lines, Figure 10, where it remains until deflected to swing lever 264 outwardly (right) for disengaging detent 269 thereof from notch 270 in latch 255. Rocking movement of said shaft 256 from the normal latching position shown in Figures 4, 8 and 15 is produced by a crank 320 secured thereto and having its free end riding on the periphery of a disc 321 secured on shaft 283 (Figures 15 and 16) and biased into engagement therewith by a spring 321a connected to crank 320 and to side wall A, as by a pin 321b, Figure 16. Disc 321 has a peripheral recess forming a reentrant cam edge 322 adapted to engage the end of crank 320 at the end of each complete operation of the machine. With the parts remaining normally in this position as seen in Figure 15, the cam surfaces 265 of shaft 256 exert no camming action on the ends of the latch levers 264; and said levers remain in the initial normal inoperative position shown in Figure 4 until latch 255 is depressed, whereupon said levers take the locking position shown in Figure 8 and in full line in Figure 12. However, during the fourth stage when disc 321 rotates 360° clockwise, Figure 16, with shaft 283, the free end of crank 320 rides up out of engagement with cam edge 322 and onto the periphery of disc 321. This imparts slight rotation to shaft 256 so that the cam faces 265 in the grooves 258 thereof, wipe against the lower edge portions of the latch levers 264 causing them to move outwardly to the extended position shown in dotted lines, Figure 10, to release the latches 255. At the end of the fourth stage, the free end of crank 320 re-engages the re-entrant cam edge 322 which enables shaft 256 to rock back to its initial position and permits spring 268 to return latch levers 264 to position to again engage the latches 255 when they are again depressed during the next second stage.

I claim:

1. Register device comprising a totalizer driving gear, a tens transfer secondary gear having a trip, means for actuating said secondary gear, means for actuating the totalizer driving gear including a spring biased pawl normally out of operative engagement therewith, a spring biased latch having a portion normally disposed in the path of movement of said trip during rotation of said secondary gear and a pawl arresting portion normally positioned to retain said pawl out of engagement with said totalizer driving gear, whereby during movement of said trip said latch is displaced and said pawl is released into yielding riding engagement with said driving gear, a spring biased keeper for holding said latch in displaced position during riding engagement of the pawl on said driving gear, means for releasing said keeper, and means for actuating said pawl to rotate said totalizer driving gear.

2. Register device comprising a first totalizer wheel, a second totalizer wheel mounted coaxially therewith, a primary gear for imparting different degrees of additive rotation to said first totalizer wheel, a lower order secondary gear having a trip, means for actuating said primary gear and said lower order secondary gear together, a higher order secondary gear, means for actuating said higher order secondary gear including a spring biased pawl movable to and from operative engagement with said higher order secondary gear, a spring biased latch having a portion normally disposed in the path of movement of the trip on said lower order secondary gear and a portion normally disposed to hold said pawl out of engagement with said higher order secondary gear, said latch being movable by said trip from said normal position to pawl releasing position whereby said pawl rides on said higher order secondary gear, a spring pressed keeper for holding said latch in pawl releasing position, a cam for releasing said keeper, and means for actuating said pawl to effect rotation of said higher order secondary gear and said second totalizer wheel.

3. Register device comprising a first totalizer wheel, a second totalizer wheel, a lower order secondary gear, a higher order secondary gear, a first primary gear arranged and adapted to impart different degrees of additive rotation to said first totalizer wheel and simultaneously therewith to said lower order secondary gear, a second primary gear arranged and adapted to impart different degrees of additive rotation to said second totalizer wheel and simultaneously therewith to said higher order secondary gear, said lower and higher order secondary gears and said primary gears being mounted coaxially, and means for effecting rotation of said higher order secondary gear independently of the aforesaid rotation thereof imparted by said second primary gear, said means including a pawl arranged and adapted to engage said higher order secondary gear, a pawl retaining and releasing latch having a portion arranged and adapted to be engaged by said lower order secondary gear to release said pawl into engagement with said higher order secondary gear, and means for actuating said pawl to rotate said higher order secondary gear.

4. Tens transfer mechanism for totalizing devices comprising a higher order secondary gear, a pawl biased toward engagement with said gear, a latch having a pawl engaging detent and a locking notch, a lever having a locking lug arranged and adapted to be engaged in said notch, a latch spring arranged and adapted to hold said detent in releasable engagement with said pawl and thereby to hold said pawl normally retracted from said gear, a lever spring arranged and adapted to normally hold said lug in yielding engagement with a portion of said latch at one side of said notch, means for moving said latch in a direction to release said pawl from engagement with said detent and into engagement with said gear and to bring said notch into latch locking engagement with said lug, and means for rocking said lever in a direction to release said lug from locking engagement with said notch.

5. Tens transfer mechanism for totalizing devices comprising a higher order secondary gear, a pawl biased toward engagement with said gear, a latch having a pawl engaging detent and a locking notch, a lever having a locking lug, a latch spring arranged and adapted to hold said detent in releasable engagement with said pawl and thereby to hold said pawl normally retracted from said gear, a lever spring arranged and adapted to normally hold said lug in yielding engagement with a portion of said latch at one side of said notch, means for moving said latch in a direction to release said pawl from said detent and into engagement with said gear and to bring said notch into latch locking engagement with said lug, a cam shaft operatively connected to said latch moving means, means operatively connected with said cam shaft to actuate said pawl while the latter engages said gear whereby said gear is rotated by said pawl, and means operatively connected to said lever and actuated from said cam shaft to rock said lever in a direction to release said lug from locking engagement with said notch.

HILARIO MORENO BANUELOS.

REFERENCES CITED

The following references are of record in the file of this patent:

UNITED STATES PATENTS

| Number | Name | Date |
| --- | --- | --- |
| 585,468 | Fuller | June 29, 1897 |
| 585,565 | Fuller | June 29, 1897 |
| 580,378 | Cleal et al. | Apr. 13, 1897 |
| 845,634 | Hallwood | Feb. 26, 1907 |
| 1,206,813 | Church | Dec. 5, 1916 |
| 1,980,232 | Blye | Nov. 13, 1934 |
| 2,063,091 | Green | Dec. 8, 1936 |
| 966,410 | Quentill | Aug. 2, 1910 |
| 773,158 | Pfaff | Oct. 25, 1904 |